A. H. MASON.
NUT LOCK.
APPLICATION FILED MAY 5, 1920.
1,366,817. Patented Jan. 25, 1921.
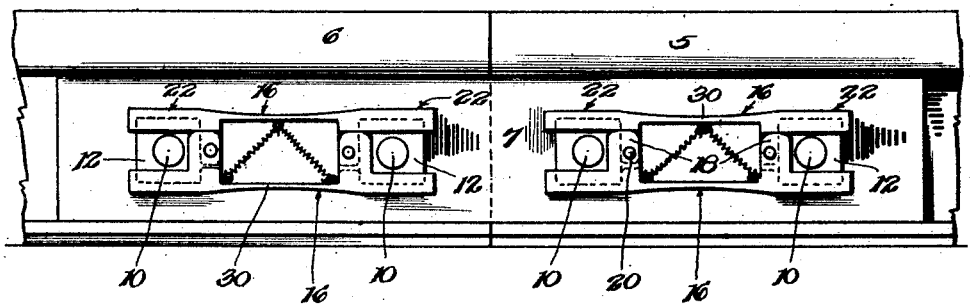
Inventor
A. H. Mason.
By Lacey & Lacey, Attorneys

UNITED STATES PATENT OFFICE.

ALBERT H. MASON, OF GAULEY BRIDGE, WEST VIRGINIA.

NUT-LOCK.

1,366,817.  Specification of Letters Patent.  Patented Jan. 25, 1921.

Application filed May 5, 1920. Serial No. 379,077.

*To all whom it may concern:*

Be it known that I, ALBERT H. MASON, a citizen of the United States, residing at Gauley Bridge, in the county of Fayette and State of West Virginia, have invented certain new and useful Improvements in Nut-Locks, of which the following is a specification.

This invention relates to improvements in nut locks especially adapted for use in connection with the bolts of rail joints though not necessarily restricted to such use.

An important object of this invention is to provide a nut lock of the class described which has novel means whereby the same may be readily and conveniently applied to a plurality of nuts for securing the same against rotation after being applied to bolts.

A further object of the invention is to provide a nut lock of the class described which has novel means whereby the same is prevented from accidental displacement when applied.

A further object of the invention is to provide a nut lock of the class described which is simple to apply, efficient in use and cheap to manufacture.

Other objects and advantages of the invention will be apparent during the course of the following description.

In the accompanying drawing forming a part of this application and in which like numerals are employed to designate like parts throughout the same, Figure 1 is a side elevation of several of the improved nut locks applied, Fig. 2 is a rear elevation of one of the improved nut locks detached, Fig. 3 is a vertical transverse section taken on line 3—3 of Fig. 1.

In the drawing wherein for the purpose of illustration is shown a preferred embodiment of the invention, the numerals 5 and 6 designate the meeting portions of longitudinally alined rails which are joined by fish plates 7. As illustrated in Fig. 1, the fish plates 7 extend over the adjacent portions of the rails 5 and 6 and are connected to the rails by transversely extending bolts 10. In this case two bolts are extended through each end portion of each rail and are provided with squared nuts 12 adapted for securely connecting the fish plates to the rails.

The improved nut lock herein illustrated is designed to lock the pairs of nuts against rotation so that the same will not be allowed to loosen as the result of vibration of the rails.

As illustrated in Fig. 2, the improved nut lock comprises two lengths of spring metal 16 each of which is formed with a pair of inwardly extending apertured ears 18 at a point spaced from its ends. The apertured ears of each of the lengths of metal 16 which, as illustrated in Fig. 3, are substantially L-shaped have their overlapped portions pivotally connected by pivot pins 20.

The portions of the lengths of metal outwardly of the pairs of pivotally connected ears 18 form jaws, generally designated by the numeral 22, which are adapted to detachably engage a pair of the nuts 12 for securing the same against rotation. Each jaw 12 is formed along its outer longitudinal edge with inwardly extending flanges 24 which engage the outer sides of the nuts so that when the device is applied to a pair of nuts accidental displacement will be rendered unlikely. The end portions of the spaced jaws are extended inwardly, as indicated at 26, and are formed integral with the inwardly extending flanges 24 so as to secure the nut lock against longitudinal movement when applied. With reference to Fig. 2, it will be noted that the inwardly extending end walls 26 are arranged in spaced relation to the inwardly extending apertured ears 18 which also serve as a means for securing the improved nut lock against longitudinal movement. The apertured ears of one of the lengths of metal is extended laterally and is disposed in the plane of the inwardly extending flanges 24 so as to coöperate with the flanges in forming a means for engaging the outer side of the nuts 12. The jaws 22 and associated elements form sockets within which the nuts 12 are adapted to be received upon the application of the device.

With particular reference to Fig. 3, it will be observed that the upper and lower walls of the sockets thus formed are inclined inwardly in opposite directions, as indicated at 28, to correspond with the inclination of the side walls of the nuts so that the jaws must be pressed outwardly or away from the nuts so as to be released from the nuts. That is to say, when the nuts are flatly engaged by the jaws 22 the inclined top and bottom walls 28 of the same form a means whereby the jaws are prevented from being accidentally released from gripping engagement with the nuts.

The intermediate portions of the lengths of metal 16 are reduced in thickness and are yieldable so that the same may be manually pressed in the direction of each other. The intermediate portions of the lengths of metal 16 thus form leaf springs 30 which in addition to connecting the jaws 22 serve as a means for pressing the same into engagement with the nuts.

In applying the improved nut lock, it is merely necessary to manually press the leaf springs 30 inwardly so as to open the jaws 22. With the jaws thus opened, the same may be engaged with opposite sides of the nuts 12, and upon releasing the leaf springs 30 the nuts will be securely held against accidental rotation. The inclination of the top and bottom walls 28 of the jaws securely prevents the accidental displacement of the device as the result of vibration of the rails incident to the movement of rolling stock over the same. In carrying out the invention, the sockets formed for the reception of the nuts may be polygonal sided so that the device may be employed for securing polygonal sided nuts against rotation.

If desired a pair of contractile coil springs 40 may be arranged between the jaws so as to reduce the amount of manual pressure necessary to move the leaf springs 30 inwardly. As clearly illustrated in Fig. 2, the coil springs 40 may be arranged in V-shaped formation and connected at one of their ends to eyelets 41 secured to the end portions of one of the leaf springs 40 and at their other ends to a single eyelet 42 secured to the intermediate portion of the other leaf spring 30.

With reference to the foregoing description taken in connection with the accompanying drawing, it will be noted that a nut lock constructed in accordance with this invention may be readily and conveniently applied without the necessity of entirely removing the bolts or providing bolts of special construction.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. The combination with a pair of jaws having their ends and sides extended inwardly thereby forming a socket, of a nut adapted to be received within said socket, and means to press said jaws into engagement with said nut.

2. A device of the class described including a pair of jaws arranged in spaced relation thereby forming a socket, and spring means for pressing said jaws into locking engagement with a nut, the opposed faces of said jaws being inclined transversely.

3. In a nut lock, the combination with a pair of jaws having inwardly extending side walls formed along their longitudinal edges thereby forming a socket, of means pivotally connecting said jaws, and spring means for pressing said jaws inwardly.

4. In a nut lock, the combination with a pair of jaws having inwardly extending side walls, of means pivotally connecting said jaws and coöperating with the jaws and said walls in forming a socket, and means for urging said jaws inwardly.

5. In a nut lock, the combination with a pair of jaws having inwardly extending walls formed along certain of their longitudinal edges, of inwardly extending apertured ears carried by said jaws, means pivotally connecting said apertured ears, said apertured ears being arranged adjacent the inwardly extending walls of said jaws and coöperating with the same and said jaws in forming a socket, and spring means for urging said jaws inwardly.

6. A nut lock comprising a pair of jaws, means pivotally connecting the jaws, the opposed sides of said jaws being inclined transversely, and means to urge said jaws inwardly.

7. A nut lock comprising a pair of jaws having their opposed sides inclined transversely and in opposite directions, ears pivotally connecting said jaws and arranged adjacent the same, flanges formed along the longitudinal edges of said jaws and coöperating with the same and said ears in forming a socket, leaf springs connected to said jaws for urging the same inwardly, and nut engaging devices carried by said springs and arranged in spaced relation to said jaws.

8. A device of the class described including pairs of pivotally connected jaws, and leaf springs having their ends connected to the jaws for simultaneously urging the same inwardly.

9. A device of the class described comprising pairs of jaws, ears pivotally connecting the jaws and extending angularly from the same, and flat leaf springs connecting the pairs of jaws and urging the same inwardly simultaneously.

10. A device of the class described comprising pairs of jaws, ears carried by said jaws and being pivotally connected, said jaws being provided with inwardly extending flanges forming walls and leaf springs having their ends connected to said jaws for urging the same inwardly, the opposed sides of said jaws being inclined transversely.

11. The combination with pairs of jaws having inwardly extending flanges, the ends of said jaws being extended inwardly and joined with said flanges, of ears extending inwardly from said jaws and being pivotally connected, said jaws being arranged in spaced relation, the inwardly extending portions of said jaws coöperating with the jaws and said ears in forming sockets, the opposed sides of said jaws being inclined transversely, leaf springs connecting the pairs of jaws for urging the same inwardly, and nuts having their outer sides inclined to conform to the inclination of the opposed sides of said jaws.

12. The combination with pairs of jaws having their opposed sides inclined transversely, of means connecting the pairs of jaws and urging the same inwardly, and nuts adapted to be arranged between said jaws and having their outer sides inclined to conform to the inclination of said jaws.

13. A device of the class described comprising pairs of jaws, ears pivotally connecting the jaws, flat leaf springs connecting the jaws and urging the same in the direction of each other, and coil springs connected to said leaf springs.

14. A device of the class described comprising pairs of jaws, ears pivotally connecting the jaws and extending inwardly from the same, a pair of flat leaf springs connecting the jaws and urging the same inwardly, and coil springs arranged in V-shaped formation and connected to the intermediate portion of one of the leaf springs and to the end portions of the other leaf spring.

In testimony whereof I affix my signature.

ALBERT H. MASON. [L. S.]